J. H. LYON.
MANURE LOADER.
APPLICATION FILED JULY 21, 1908.

966,030.

Patented Aug. 2, 1910.
2 SHEETS—SHEET 2.

WITNESSES:
R. E. Hamilton
M. Cox.

INVENTOR.
John H. Lyon,
BY
F. G. Fischer
ATTORNEY.

UNITED STATES PATENT OFFICE.

JOHN H. LYON, OF BALDWIN, KANSAS.

MANURE-LOADER.

966,030. Specification of Letters Patent. Patented Aug. 2, 1910.

Application filed July 21, 1908. Serial No. 444,658.

*To all whom it may concern:*

Be it known that I, JOHN H. LYON, a citizen of the United States, residing at Baldwin, in the county of Douglas and State of Kansas, have invented certain new and useful Improvements in Manure-Loaders, of which the following is a specification.

My invention relates to a portable wagon loader; and my principal object is to provide a machine for gathering manure and debris in stock-yards and loading it into wagons.

The machine may also be used to advantage in gathering loose dirt, stones, &c., and depositing the same in a pile, or loading it into a wagon.

Figure 1:
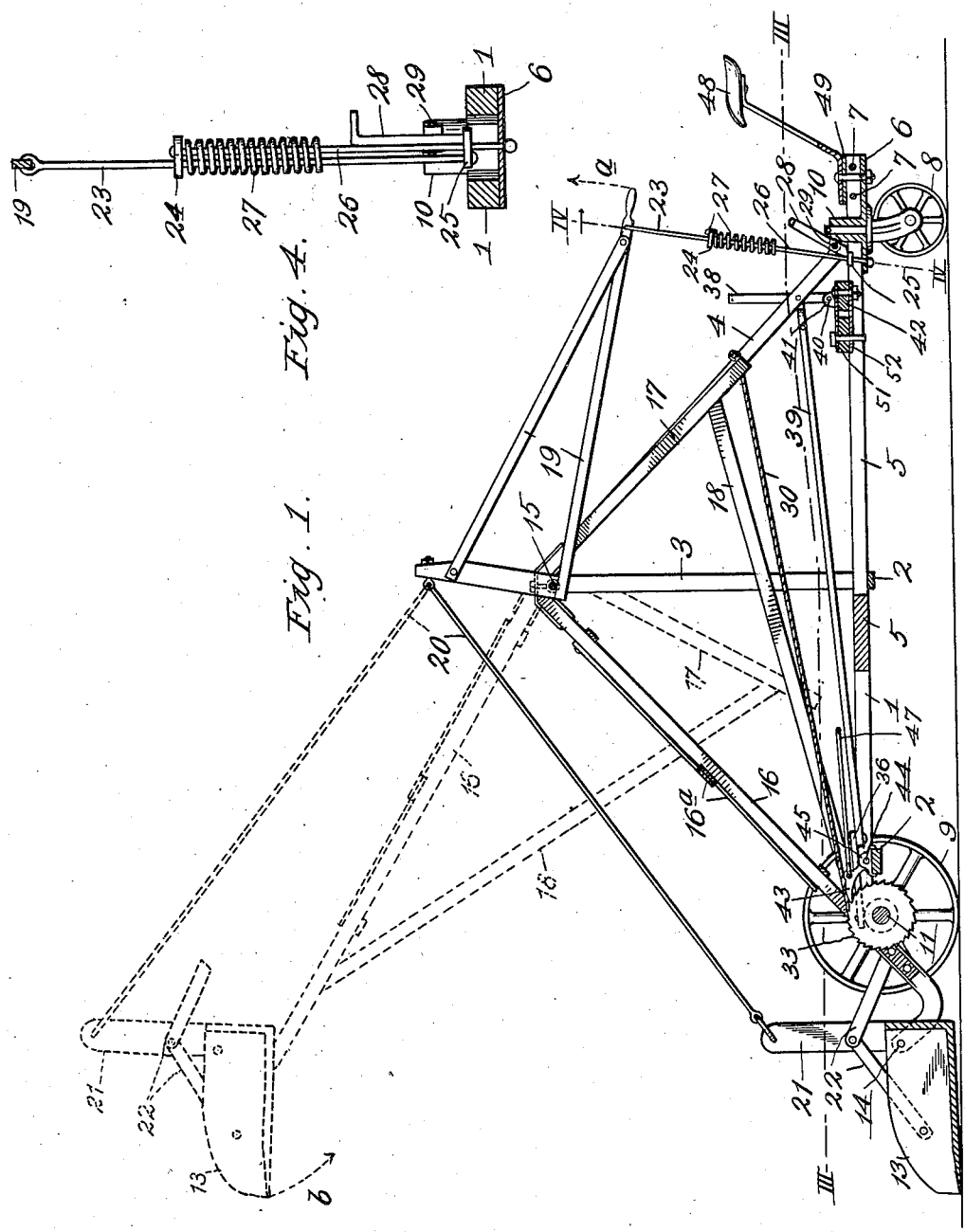
Figure 2:
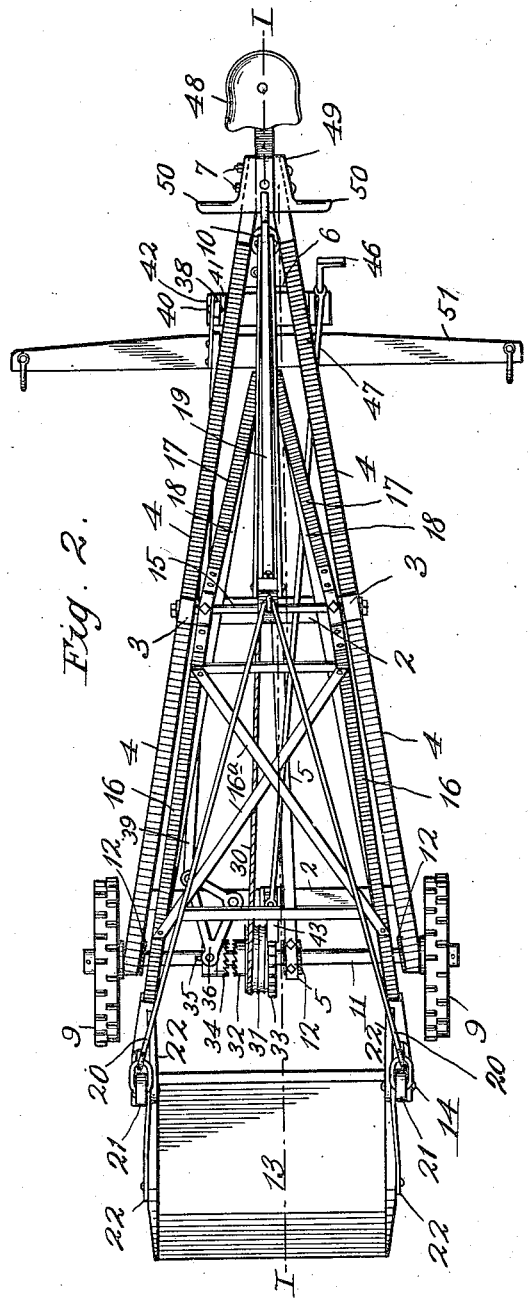
Figure 3:
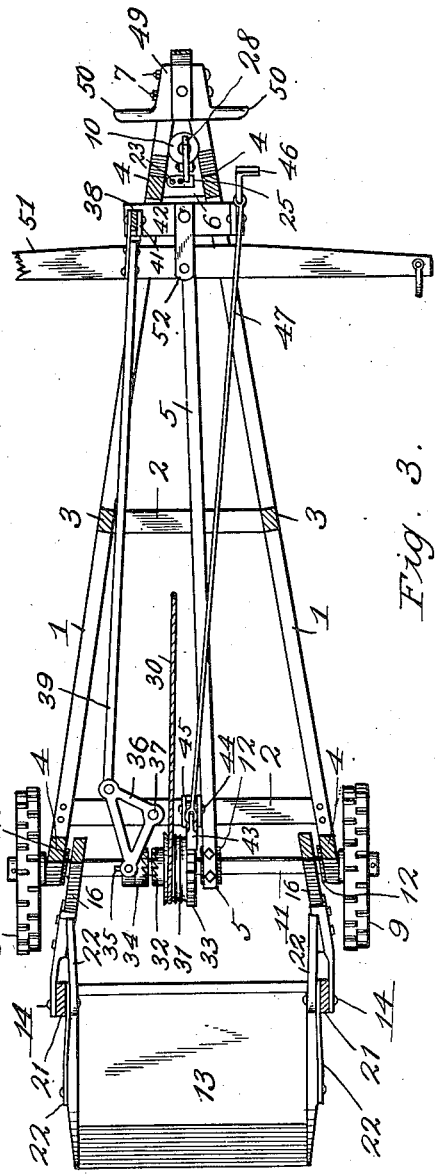

In order that the invention may be fully understood, reference will now be made to the accompanying drawings, in which:

Figure 1 represents an irregular vertical longitudinal sectional view of the invention on line I—I of Fig. 2. Fig. 2 is a plan view of the same. Fig. 3 is an irregular horizontal section on line III—III of Fig. 1. Fig. 4 is a section on line IV—IV of Fig. 1.

In carrying out the invention I employ a frame consisting of a pair of diverging sills 1, transverse sills 2 connecting the diverging sills, a pair of posts 3 secured to sills 1, braces 4 extending from sills 1 to the upper ends of posts 3, a centrally-disposed longitudinal sill 5 connected to sills 2 and the diverging rear ends of sills 1, and a casting 6 also secured to the diverging rear ends of the sills. The diverging rear ends of sills 1 are connected by bolts 7.

The frame is carried by a rear caster-wheel 8 and a pair of front wheels 9, the shank of the caster-wheel being mounted in a bearing 10 integral with casting 6, while the front wheels 9 are mounted upon an axle 11 with which they have customary pawl and ratchet connections, so that when the machine advances wheels 9 will drive the axle 11. Axle 11 is journaled in bearings 12 secured to the undersides of the forward portions of sills 1 and 5.

13 designates the shovel whereby the material is gathered from the ground. Said shovel is pivotally secured by pins 14 to the forward upturned terminals of a derrick which is pivotally mounted at its upper end upon a shaft 15 extending through the upper ends of posts 3. Said derrick consists substantially of a triangular frame comprising a pair of forwardly-inclined members 16 reinforced by braces 16ª, a pair of rearwardly-inclined members 17, and a pair of members 18 uniting the lower portions of members 16 17.

19 designates a triangular-shaped dumping-lever mounted on shaft 15 between the upper ends of the derrick and connected at its forward upper end by a pair of rods 20 to a pair of arms 21, extending upwardly from the rear portion of shovel 14 and provided with braces 22 whereby they are further secured to said shovel. Said braces also extend rearwardly and abut against the front side of the derrick to prevent the forward end of the shovel from tipping upward and sliding over the material. The rear end of the dumping-lever is yieldingly connected to casting 6 by a spring-and-rod connection consisting of a rod 23 connected at its upper end to the lever and provided with two slidably mounted washers 24 25, a rod 26 extending through the washers and casting 6, and provided at its terminals with heads to prevent it from drawing through washer 24 and casting 6, and a spiral spring 27 embracing rods 23 26 and secured at its upper end to washer 24. Said spring-and-rod connection is normally held in the contracted position, shown in Figs. 1 and 4, by a trip-lever 28 pivotally mounted upon a pin 29 and adapted to engage the upper side of washer 25.

The derrick, together with the shovel, is raised and lowered to the positions shown by dotted lines and full lines Fig. 1, by a cable 30 and a drum 31, which latter is loosely mounted upon axle 11 and provided at its opposite sides with a clutch member 32 and a ratchet-wheel 33. The drum 31 is adapted to be locked upon the axle so as to rotate therewith when the machine is traveling forward, by a clutch member 34, which is slidably mounted upon the axle, but caused to rotate therewith through the intermediacy of a feather 35. Clutch member 32 is shifted into and out of engagement with clutch member 34 by means of a bell-crank lever 36, pivotally mounted upon a pin 37 secured to the forward sill 2, a lever 38, and a connecting-rod 39, pivoted at its ends to the bell-crank lever and lever 38.

Lever 38 is fulcrumed upon a pin 40 extending through a pair of lugs 41 projecting upward from a cross-piece 42 secured to the rear portions of sills 1 and 5. The drum is prevented from rotating backward by the ratchet-wheel 33 and a pawl 43, which latter is pivotally mounted upon a pin 44 extending upward from a pair of lugs 45 secured to the forward cross sill 2. Pawl 43 may be drawn into and out of engagement with the ratchet-wheel by a lever 46 and a connecting-rod 47 secured at its ends to the pawl and the ratchet.

Levers 19, 28, 38, and 46 are located near the driver's seat 48 secured upon a casting 49, and provided with a foot-rest 50. By thus locating the levers the driver may operate the shovel without leaving the seat.

51 designates an equalizer to which the draft animals are hitched, said equalizer being pivotally secured to a clevis 52 secured to the cross-piece 42.

The operation, briefly stated, is as follows: When the machine advances to load the shovel, clutch member 34 is held out of engagement with clutch member 32. When the shovel is filled and the machine approaches a wagon, or other place where the load is to be dumped, clutch member 34 is thrown into engagement with clutch member 32 so that the drum will be rotated to wind cable 18 thereon and lift the derrick to the dotted position shown in Fig. 1. After the shovel has been raised to the desired height clutch member 34 is disengaged from clutch member 32 and the shovel is dumped by disengaging trip-lever 28 from washer 25, so that said washer may move upward with rod 23 and permit the rear end of the dumping lever 19 to tip upwardly as indicated by the arrow $a$, until the washer 25 contacts with the lower terminal of spring 27, which performs the function of a cushion in gradually checking the movement of the dumping lever. As the rear end of the dumping lever moves upward, the shovel swings downward in the direction of arrow $b$, and thus discharges its load. The derrick and the shovel are now gradually lowered by backing the machine, throwing clutch member 34 into engagement with clutch member 32, and disengaging pawl 43 from ratchet-wheel 33 so that the drum may rotate backwardly with the axle to unwind the cable and thus gradually lower the derrick.

Having thus described my invention, what I claim is:—

1. In a machine of the character described, a wheeled-frame, an axle journaled therein, a drum loosely-mounted upon said axle, means for locking said drum upon the axle, a derrick pivotally-mounted upon the wheeled-frame, a cable connecting the drum and the derrick, a shovel pivotally-mounted at the forward end of the derrick, a dumping-lever fulcrumed on the machine for controlling the pivotal movement of the shovel, and a trip-lever for locking said dumping-lever in an inoperative position.

2. In a machine of the character described, a wheeled-frame, a derrick pivotally-mounted thereon, means for raising and lowering said derrick, a shovel pivotally-mounted at the forward end of said derrick, arms extending upward from said shovel, means connected to said arms for dumping the shovel, and braces secured to the shovel and said arms and adapted to abut against the derrick when the latter is in a lowered position.

3. In a machine of the character described, a wheeled frame carrying a shaft, a derrick pivotally-mounted upon said shaft, a shovel pivotally-mounted at the forward end of said derrick, a dumping lever also pivotally-mounted upon the shaft, rods extending substantially parallel with the front portion of the derrick and connected at their ends to the dumping-lever and the shovel to hold the latter level while being raised, and means for tripping the dumping-lever after the shovel has been raised.

In testimony whereof I affix my signature, in the presence of two witnesses.

J. H. LYON.

Witnesses:
F. G. FISCHER,
M. COX.